United States Patent [19]
Höhlein et al.

[11] Patent Number: 4,677,181
[45] Date of Patent: Jun. 30, 1987

[54] POLYHYDROXYL COMPOUNDS CONTAINING ETHER AND ESTER GROUPS AND THEIR USE IN THE PRODUCTION OF POLYURETHANE PLASTICS

[75] Inventors: Peter Höhlein, Kempen; Alois Fehlbier, Burscheid; Hermann Gruber, Leverkusen, all of Fed. Rep. of Germany

[73] Assignee: Bayer Aktiengesellschaft, Bayerwerk, Fed. Rep. of Germany

[21] Appl. No.: 888,541

[22] Filed: Jul. 21, 1986

[30] Foreign Application Priority Data

Jul. 26, 1985 [DE] Fed. Rep. of Germany ....... 3526790

[51] Int. Cl.$^4$ .............................................. C08G 18/32
[52] U.S. Cl. .................................... 528/74.5; 528/75; 528/76; 528/77; 528/78; 560/112; 560/224; 560/240
[58] Field of Search ................... 528/74.5, 75, 76, 77, 528/78; 560/112, 224, 240

[56] References Cited

U.S. PATENT DOCUMENTS 3,776,948 12/1973 Kleemann et al. ................... 560/240
4,011,251 3/1977 Tjurin et al. .......................... 560/240
4,561,922 12/1985 Peerman et al. ....................... 528/76

OTHER PUBLICATIONS

Wagner Sarx, Lackkunstharze, 5th Edition, Carl Hanser Verlag, Munich, 1971, pp. 153-173.
Kunststoff Handbuch, vol. 7, Hanser Verlag, 1983, pp. 540-561 (corresps. in English Version to Sec. 10, pp. 510-529).
Kunststoff Handbuch, vol. 7, Hanser Verlag, 1983, pp. 425-428, (corresps. in English Version to Sec. 8.1, pp. 402-405).

Primary Examiner—Maurice J. Welsh
Attorney, Agent, or Firm—Gene Harsh; Joseph C. Gil; Thomas W. Roy

[57] ABSTRACT

The present invention is directed to polyhydroxyl compounds containing both ether and ester groups, having an average hydroxyl functionality of 2 to 6 and an average hydroxyl number of about 100 to 600, based on the esterification product of (i) polyether polyols having an average hydroxyl functionality of 3 to 8 and an average hydroxyl number of about 200 to 1000 with (ii) about 5 to 70 equivalent %, based on the hydroxyl group of component (i) and the carboxyl group of component (ii), of organic monocarboxylic acids. The present invention is also directed to the use of the polyhydroxyl compounds as synthesis components in the production of polyurethane plastics materials by the isocyanate-polyaddition process, particularly their use as the polyol component in two-component polyurethane coating agents and/or polyurethane casting systems which are solvent-free or have a low solvent content.

6 Claims, No Drawings

POLYHYDROXYL COMPOUNDS CONTAINING ETHER AND ESTER GROUPS AND THEIR USE IN THE PRODUCTION OF POLYURETHANE PLASTICS

BACKGROUND OF THE INVENTION

1. Field of the Invention

The present invention relates to new ether and ester group-containing polyhydroxyl compounds, which are produced by esterifying polyether polyols with monocarboxylic acids, and their use as polyol component in the production of polyurethane plastics materials, particularly in two-component polyurethane coating agents or polyurethane casting compositions.

2. Description of the Prior Art

Coating agents and casting compositions containing mixtures as binders which react to completion to form polyurethanes are known (c.f. e.g. Wagner Sarx, Lackkunstharze, 5th Edition, Carl Hanser Verlag, Munich, 1971, page 153 to 173 and Kunststoffhandbuch, Volume 7, Hanser Verlag 1983, page 540 to 561, and pages 425–428).

On pages 169 to 170 of the first mentioned publication and on pages 556 to 559 of the second mentioned publication, solvent-free systems are also described which allow coatings with a desired thickness to be produced in a working process. The solvent-free coating agents have become particularly interesting in connection with the stricter environmental regulations. Low viscosity starting materials are necessary for the production of solvent-free coatings. Polyisocyanate mixtures of the diphenyl methane series are generally used as the polyisocyanate component (mixtures of 4,4'-diisocyanatodiphenyl methane and optionally 2,4'-diisocyanatodiphenyl methane with varying quantities of higher functional homologues, as are obtained by the phosgenation of aniline/formaldehyde condensation products). However, difficulties occur in the selection of the polyol component. The available hydroxyl group-containing polyester polyols provide good mechanical properties after cross-linking the polyisocyanates, but have deficiencies with respect to stability to hydrolysis. Furthermore, the hydroxyl group-containing polyester polyols are highly viscous due to their chemical constitution, which is a disadvantage for the production of solvent-free systems. The known hydroxyl group-containing polyether polyols often have a sufficiently low viscosity and are also resistant to hydrolytic influences, but result in polyurethanes having mechanical properties which are clearly inferior to the polyester urethanes. Moreover, the known polyether polyols are not well suited for reaction with polyisocyanates in coatings since they have a tendency to form bubbles.

Various proposals have been made for the elimination of the disturbing formation of bubbles. Alkali-aluminosilicates with a zeolite structure which are activated in solvent-free polyurethane coatings and serve to bind the disturbing moisture, are often used. These synthetically produced alkali-aluminosilicates have become known as molecular sieves. However, in spite of the use of molecular sieve zeolites, processing, particularly with high air moisture, often results in the damaging formation of foam, especially when using pure polyether polyols.

It is thus an object of the present invention to provide new polyhydroxyl compounds which do not suffer from the above disadvantages, have a viscosity which is sufficiently low for two-component polyurethane systems which are solvent-free or have a low solvent content, have good compatibility with the reaction partners (polyisocyanates), are suitable as a binder component for two-component polyurethane coating agents or polyurethane casting compositions and can be processed to form bubble-free end products with good mechanical properties.

This object may be achieved by the preparation of the polyhydroxyl compounds according to the invention described in more detail below.

SUMMARY OF THE INVENTION

The present invention is directed to ether and ester group-containing polyhydroxyl compounds having an (average) hydroxyl functionality of 2 to 6 and an (average) hydroxyl number of about 100 to 600, characterized in that they represent the esterification product of (i) polyether polyols having an (average) hydroxy functionality of 3 to 8 and an (average) hydroxyl number of about 200 to 1000 with (ii) about 5 to 70 equivalent %, based on the hydroxyl groups of component (i) and the carboxyl groups of component (ii), of organic monocarboxylic acids.

The present invention is also directed to the use of the polyhydroxyl compounds as a synthesis component in the production of polyurethane plastics materials according to the isocyanate polyaddition process, particularly as the polyol component in two-component polyurethane coating agents or polyurethane casting compositions which are solvent-free or have a low solvent content.

DETAILED DESCRIPTION OF THE INVENTION

Systems "with a low solvent" content are those coating agents or casting compositions having a solvent content of at most about 5% by weight, based on the weight of the binder components and the solvent, and wherein the solvents have a boiling point of below 150° C. under normal pressure.

The fact that the object according to the invention can be achieved with the polyhydroxyl compounds according to the invention is surprising since a large portion by weight of the polyhydroxyl compounds according to the invention are based on polyethers which are known to be susceptible to the formation of bubbles.

Starting materials (i) for the production of the polyhydroxyl compounds according to the invention are polyether polyols or polyether polyol mixtures having an (average) hydroxyl functionality of 3 to 8, preferably 3 to 6, and an (average hydroxyl number of about 200 to 1000, preferably about 250 to 800 mg of KOH/g. These polyether polyols can be obtained in a known manner by the alkoxylation of suitable starting compounds or mixtures of starter compounds, whereby during the alkoxylation, mixtures of alkylene oxides, particularly propylene oxide and/or ethylene oxide, are added in admixture or successively. Other alkylene oxides include 1,2-butylene oxide, 2,3-butylene oxide or styrene oxide. Suitable starter compounds include at least trifunctional alcohols such as glycerine, trimethylol propane, pentaerythritol, sorbitol, mannitol, sucrose, lactose, sorbitan, α-methyl glycosite, α-hydroxyalkyl glycosite or mixtures thereof. These compounds may be admixed with difunctional starter molecules such as water, ethylene glycol, propylene glycol, 1,4-dihydroxy butane, diethylene glycol or dipropylene glycol. When using mixtures of starter compounds, the above requirements regarding hydroxyl functionality must be observed. A polyether polyol having an average hydroxyl functionality 3.0 to 4.8 may be produced from sorbitol (functionality=6) or sorbitan (functionality=4) and ethylene glycol or propylene glycol or water (functionality=2). It is, however, not necessary for the functionality of component (i) to be set by the selection of the starter molecules to be used during alkoxylation because it is also possible to mix separately produced polyether polyols of different functionality and hydroxyl number such that the mixture corresponds to the above-mentioned conditions with respect to functionality and hydroxyl number. It is also possible to use mono or polyamines such as ethylamine, ethanolamine, ethylene diamine or hexamethylene diamine as starter molecules in the production of the polyether polyols or the individual components of the polyether polyol mixture.

Desired natural or synthetic monocarboxylic acids or mixtures of monocarboxylic acids can be used as component (ii) in the production of the polyhydroxyl compounds according to the invention. The monocarboxylic acids contain 2 to 30, preferably 10 to 30 and most preferably 10 to 24 carbon atoms. Aliphatic monocarboxylic acids are preferably used and particularly preferred are unsaturated fatty acids having an iodine value of 10 to 300. Examples of suitable monocarboxylic acids are acetic acid, butyric acid, n-heptane-carboxylic acid, n-nonane carboxylic acid, n-tridecane-carboxylic acid, palmitic acid, stearic acid, benzoic acid, synthetic fatty acid mixtures having 10 to 18 carbon atoms and in particular unsaturated fatty acids such as soya fatty acid, peanut oil fatty acid, safflower oil fatty acid, konjuvand oil fatty acid, oleic acid, tall oil fatty acid or mixtures of such carboxylic acids. The simultaneous use of small quantities (up to about 20 equivalent %, based on the carboxyl groups) of multibasic carboxylic acids such as adipic acid, phthalic acid or terephthalic acid in principle is not ruled out. However, it is not preferred since the simultaneous use of such multibasic acids generally leads to an undesirable increase in viscosity. The used monocarboxylic acids preferably have no substituents such as hydroxyl groups. Completely ruled out is the use of esters of hydroxycarboxylic acids, particularly castor oil, in place of the monocarboxylic acids because of transesterification.

The monocarboxylic acids are used in the production of the polyhydroxyl compounds according to the invention in a quantity of about 5 to 70, preferably about 10 to 65 equivalent %, based on the hydroxyl groups of component (i) and the carboxyl groups of component (ii).

The esterification reaction is conducted in known manner by heating mixtures of components (i) and (ii) to about 180° to 260° C. with the optional use of known esterification catalysts such as dibutyl tin dilaurate, dibutyl tin oxide or tetraisopropyl titanate and known auxiliaries such as entrainers for the resulting water. The esterification reaction is generally carried out under inert gas and maintained until the acid number of the reaction mixture has fallen to a value of below 5 mg KOH/g. Components (i) and (ii) are preferably reacted with each other in the absence of a solvent. Suitable esterification processes are described, for example, in the following literature:

1. Temple C. Pattan, Alkyd-Resin-Technology, Interscience Publishers John Wiley & Sons, New York, London 1962;
2. Dr. Johannes Scheiber, Chemie und Technologie der kunstlichen Harze, Wissenschaftliche Verlagsgessellschaft mbH, Stuttgart, 1943;
3. Hans Wagner und Hans Friedrichs Sarx, Lackkunstharze, 4th Edition, Carl Hanser Verlag, Munich, 1959;
4. Ulmans Enzyklopadie der technischen Chemie, Volume 14, pages 80 to 106, 1963.

The polyhydroxyl compounds according to the invention have an (average) hydroxyl functionality of 2 to 6, preferably 2 to 4, an (average) hydroxyl number of about 100 to 600, preferably about 120 to 400 and an acid number of below 5. Their viscosity is generally about 250 to 3500 mPa.s/20° C. They are outstandingly suitable as a polyol component for two-component polyurethane systems which are solvent-free or have a low solvent content, particularly polyurethane coating agents or polyurethane casting compositions.

For this use, the polyhydroxyl compounds according to the invention are combined with a suitable polyisocyanate component to produce the two-component polyurethane binder.

For this purpose organic polyisocyanates which are liquid at room temperature are preferably used. Examples include liquid polyisocyanates based on diisocyanatodiphenyl methane (i.e., liquid mixtures of 4,4'-diisocyanatodiphenyl methane with 2,4'-diisocyanatodiphenyl methane, liquid derivatives of 4,4'-diisocyantodiphenyl methane and optionally 2,4'-diisocyanatodiphenyl methane such as the reaction products thereof with subequivalent quantities of multihydric alcohols, particularly polypropylene glycols having molecular weights of less than 700 or the carbodiimide-modified derivatives of these diisocyanates), tris-(isocyanatohexyl)-isocyanurate or mixtures with the higher homologues thereof, tris-(isocyanatohexyl)-biuret or the mixtures with the higher homologues thereof or liquid low molecular weight, NCO prepolymers based on 2,4-diisocyanato-toluene. However, polyisocyanate mixtures of the diphenyl methane series as are obtainable by phosgenation of aniline formaldehyde condensation products and are preferably used as polyisocyanate component. Mixtures of the polyisocyanates named by way of example may also be used. For thermally hardenable mixtures, isocyanates may also be used in reversible blocked form.

For the production of the two-component binders, the polyhydroxyl compounds according to the invention are mixed with the polyisocyanate component in such a quantity to provide an equivalent ratio of isocyanate groups to isocyanate-reactive groups of about 0.5:1 to 2.5:1, preferably about 0.8:1 to 1.5:1. By suitable selection of the equivalent ratio, and by suitable selection of the named starting components, it is possible to adjust the mechanical properties of the surface coatings obtained.

Prior to mixing the individual components, auxiliaries and additives known in polyurethane chemistry can be added thereto. As already explained, the two-component systems can be processed in the absence of solvent or with small quantities of solvent (low solvent content) according to known methods for the production of coatings or casting compositions. Aromatic solvents (such as toluene, xylene and solvent naphtha), solvents of the ester type (such as ethylacetate and butyl acetate), ketones (such as methyl isobutyl ketone and cyclohexanone) may be used as solvents in low quantities. Furthermore, catalysts can be added to the two-component systems to accelerate the reaction between the isocyanate groups and the active hydrogen atoms of the esterification products. Catalysts include dibutyl tin dilaurate, tin-II-octoate or amine catalysts such as dimethylbenzyl amine.

Further auxiliaries and additives include chlorinated paraffins, dioctyl phthalate, trioctyl phosphate and paraffin sulphonic acid phenyl ester. For procssing as casting resins and coatings, fillers (such as calcium carbonate, barite, quartz powder, sawdust, rubber and cork powder), levelling agents, thickening agents and deaeration agents may be added. Organic dyes and inorganic pigments such as titanium dioxide and iron oxide may also be used. The moisture adhering to the fillers and pigments can be removed by previous drying or by the simultaneous use of water-absorbent materials such as molecular sieve zeolites.

The production of coatings on desired substrates is the preferred use according to the invention. The coating may be applied by casting, doctoring, rolling, rubbing, injecting by means of airless injection machines according to the hot injection process or by conventional injection means. The use according to the invention is suitable for coating substrates such as metals, concrete, asphalt or plastics materials (such as PVC, polystyrene or polyurethane). It is possible to not only produce self-levelling floor coatings and industrial floor coverings highly filled with quartz additives, but also acidproof linings of concrete and steel containers can be produced. The two-component systems to be used according to the invention are also suitable for the production of castings or interior linings of steel tubes and as casting compositions for the production of condensors in the construction of molds and templates. The ability according to the invention to form an undisturbed surface is a particular advantage.

The invention is further illustrated but is not intended to be limited by the following examples in which all parts and percentages are by weight unless otherwise specified.

EXAMPLES

Example 1

4853 g of soya oil fatty acid and 8459 g of a propoxylated mixture of sorbitol and propylene glycol (mol ratio 2:1) with a hydroxyl number of 475 mg KOH/g and an equivalent weight of 118 were reacted while introducing 5 to 6 liter of nitrogen/hour in a 15 liter stirring vessel equipped with stirrer, heating, nitrogen inlet tube, column and water outlet. Heating was then carried out for about 3 hours to 200° C. The temperature measured at the head of the column did not exceed 105° C. As soon as a sump temperature of 200° C. was reached and the head temperature exceeded 90° C., the column was removed and the nitrogen flow was increased to 30 liter/hour. Condensation was carried out until an acid number of 1.4 mg of KOH/g of substance was reached. Cooling to 100° C. was then carried out and the finished product was filtered over a fibrous filter. A polyhydroxyl compound according to the invention was obtained with an iodine color value of 5, a viscosity of 813 mPa.s at 20° C., an OH number of 223 mg KOH/g and an average hydroxyl functionality of 3.4

Example 2

The procedure was as described in Example 1 except that 5259 g of synthetic fatty acid (Prifac 7990, molecular weight=300, producer: Unichema) and 8556 g of a propoxylated mixture of sorbitol and propylene glycol (molar ratio 2:1) having an OH number of 475 were reacted. After the reaction, a slightly viscous polyhydroxyl compound according to the invention was obtained which had a viscosity of 1570 mPa.s at 20° C., an iodine color value of 12, an acid number of 2.4, an OH number of 234 and an average hydroxyl functionality of 3.4.

Example 3

The procedure was as in Example 1 except that 5142 g of tall oil fatty acid and 8682 g of a propoxylated mixture of sorbitol and propylene glycol (molar ratio 2:1) having an OH number of 475 were reacted. After the reaction, a slightly viscous polyhdyroxyl compound according to the invention was obtained which had a viscosity of 1017 mPa.s at 20° C., an acid number of 2.4 mg KOH/g, an iodine color value of 5, an OH number of 231 mg of KOH/g and an average hydroxyl functionality of 3.4.

Example 4

The procedure was as in Example 1 except that 6489 g of soya oil fatty acid and 7428 g of a propoxylated mixture of sorbitol and propylene glycol (molar ratio 2:1) having an OH number of 475 were reacted. After the reaction, a slightly viscous polyhydroxyl compound according to the invention was obtained which had a viscosity of 490 mPa.s at 20° C., an acid number of 1.8 mg KOH/g, a color value of 5, an OH number of 174 mg KOH/g and an average hydroxyl functionality of 2.8.

Example 5

The procedure was as in Example 1 except that 5988 g of soya oil fatty acid and 7899 g of propoxylated sorbitol having a viscosity of 49,300 mPa.s at 20° C. and an OH number of 411 mg KOH/g are reacted. After the reaction, a slightly viscous polyhydroxyl compound according to the invention was obtained having a viscosity of 1035 mPa.s, an acid number of 1.5 mg KOH/g, an iodine color value of 3, an OH number of 156 mg KOH/g and an average hydroxy functionality of 2.1.

Example 6

The esterification product from Example 1 was applied to a glass plate as a coating material in a layer thickness of about 1 mm in combination with a polyisocyanate mixture of the diphenyl methane series having an NCO content of 31% by weight and a viscosity at 20° C. of 130 mPa.s according to the following formulation set out in Table form. This coating system was compared with two-coating systems in which polyether polyols according to the prior art were used as polyhydroxyl compounds. In Comparative Example 1, a mixture (polyol I) of equal parts by weight of a propoxylated product of trimethylol propane having an OH number of 336 and polypropylene glycol having an OH number of 112 was used. In Comparative Example 2 the propoxylation product of a mixture of propylene glycol and sorbitol having an OH number of 504 and an average hydroxyl functionality of 4.5 (=polyol II) was used.

The comparative data set out in the Table clearly shows that the system according to the invention has substantial advantages when compared with the comparative examples with respect to compatibility and also with respect to the condition of the surface.

TABLE

| (Quantity data in parts by weight) | | | |
| --- | --- | --- | --- |
| Comparison 1 (Polyol I) | 100 | / | / |
| Comparison 2 (Polyol II) | / | 100 | / |
| Example 1 | / | / | 100 |
| Molecular sieve (sodium aluminosilicate) | 10 | 10 | 10 |
| Bevaloid 6420[1] agent | 0.3 | 0.3 | 0.3 |
| DBTL, 10% in xylene | 0.4 | / | / |
| Polyisocyanate | 62 | 118 | 62 |
| Preliminary reaction (min) | 60 | 30 | none |
| Compatibility | some | substantial | complete compatibility |
| Processing time (h) | 2 | 50 | 2 |
| Surface | bubbles | some bubbles dimples | bubble-free |
| Shore hardness | | | |
| A/D 1$^d$ 80° C. | —/70 | —/84 | —/72 |
| 1$^d$ RT | 52/— | —/84 | —/35 |

[1]Commercial antifoaming agent, producer: Chemical Manufacturers
[2]Dibutyl tin dilaurate Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyhydroxyl compound containing both ether and ester groups, and having an average hydroxyl functionality of about 100 to 600, comprising the esterification product of
    (i) at least polyether polyol having an average hydroxyl functionality of 3 to 8 and an average hydroxyl number of about 200 to 1000 with,
    (ii) about 5 to 70 equivalent %, based on the hydroxyl groups of component (i) and the carboxyl groups of (ii), of an organic monocarboxylic acid.

2. The polyhydroxyl compound of claim 1 wherein said organic monocarboxylic acid comprises a fatty acid having more than 10 carbon atoms.

3. The polyhydroxyl compound of claim 1 wherein said organic monocarboxylic acid comprises an unsaturated fatty acid having more than 10 carbon atoms and an iodine value of about 10 to 300.

4. A process for the production of a polyurethane plastics material which comprises reacting the polyhydroxyl compound of claim 1 with a polyisocyanate according to the isocyanate-polyaddition process.

5. The process of claim 4 wherein said polyurethane plastics material is a two-component polyurethane coating.

6. The process of claim 4 wherein said polyurethane plastics material is a two-component polyurethane casting composition.

* * * * *